April 29, 1958 — E. W. LAHAR — 2,832,382
TRACTOR MOUNTED LAND CLEARING TREE SHAVER
Filed Aug. 3, 1956 — 2 Sheets-Sheet 1

INVENTOR.
E. W. Lahar
BY
ATTORNEY

United States Patent Office 2,832,382
Patented Apr. 29, 1958

2,832,382

TRACTOR MOUNTED LAND CLEARING TREE SHAVER

Ernest Wade Lahar, Mountain Home, Ark., assignor to Wade Lahar Construction Company, Mountain Home, Ark., a corporation of Arkansas Application August 3, 1956, Serial No. 602,005

2 Claims. (Cl. 144—34)

This invention relates to an implement for clearing land and more particularly, but not by way of limitation, to a V-type cutter attachment for a tractor or the like and which is adapted for clearing timberland in an expeditious manner.

Many thousands of acres of timberland today are being cleared to provide land which is usable for other purposes. This timberland is usually covered with many types of vegetation, including a variety of trees of many different sizes. The task of clearing the land of the vegetation is quite arduous, and since the work is usually done by contracting which results from competitive bidding, it is very important to maintain the cost of the clearing operation at a minimum.

Much of the land to be cleared has been previously cut over and the terrain is often in such a condition that it is not readily adaptable for cultivation. Furthermore, the physical characteristics of the land itself is often such that the contour of the land is uneven and rough. The trees and other vegetation are severed at a point substantially adjacent the ground, or preferably slightly below the surface, and felled in such a manner that the continuous forward movement of the clearing apparatus will not be hindered. Thus, an efficient plow or tree cutter must move through the existing vegetation and debris on the timbered area, severing the standing vegetation and pushing aside any previously felled timber or debris. It is desirable to accomplish this operation by a continuous forward movement of the clearing implement, leaving behind a swath of felled vegetation on each side of the cutter implement. The tree felling or plowing operation is continued throughout parallel row after row, much in the same manner as a farmer plowing a field for his crops, until the timberland is cleared. It will be apparent that trees felled in one row will often fall into the path of the next succeeding rows, and must thereby be pushed aside by the succeeding cuts through the land, thereby creating an even greater task in the clearing operation.

Many tree shavers or land clearing implements are in use today. Most of these devices utilize a V-type cutter blade attached to a crawler or caterpillar type tractor which serves as the source of motive power to move the cutting elements over and through the terrain. The presently available cutter blades are usually pivotally secured to the C-frame of the tractor, and are pushed along the ground and through the vegetation ahead of the tractor, such as shown in the patent to E. V. Moran, No. 2,404,518, issued July 23, 1946, and entitled "Tractor Implement." In clearing operations on relatively flat ground, or ground of a constant slope, and particularly where only single trees or scattered trees are felled, such implements are satisfactory. However, on the uneven ground and heavy timbered areas as hereinbefore set forth, the normal pivotally secured cutter blade is inefficient. By way of example, assume that the cutting blade has engaged a tree and is slightly embedded therein for cutting, and the tractor is moving forward on ground which is uneven. The uneven ground will cause a change in the slope of the horizontal plane of the tractor. This change causes a pivoting of the cutter blades to alter the slope of the horizontal plane of the cutters in accordance with the change of the position or pitch of the tractor. Although the blade engaging or cutting into the tree may not be changed in its height from the ground, the angle of disposition of the blade will be changed to cause a wedging of the blade in the tree. It is thus usually necessary to stop the cutting action and back the tractor away from the tree in order to disengage the tree from the cutters. Then a new cutting engagement must be made. It will be apparent that every stoppage of the mowing or plowing operation is a detriment to the expeditious clearing of the land and is therefore undesirable.

The present invention contemplates a tree shaver apparatus which is secured to the C-frame of a tractor in a manner providing for a lost motion area between the cutting blades and the C-frame. In this manner, the horizontal plane of the cutting elements is not appreciably changed by alterations of the horizontal plane or slope of the tractor moving over the uneven terrain. The tractor may thus move forward continuously to provide for a substantially uninterrupted cutting operation in one direction for the entire width of the area being cleared, which is usually slightly below the ground's surface. Furthermore, the novel tree shaver apparatus is provided with a rack or canopy member for protecting the tractor and the driver, or operator, from the falling debris and trees. The felled timber rolls harmlessly off the sides of the canopy in much the same manner that soil rolls off the sides of a turning plow. Thus, the canopy provides for a longer life for the tractor, and is a safety feature for the operator of the equipment.

It is an important object of this invention to provide a novel tree shaver apparatus which may be operated substantially continuously in one direction in a substantially constant plane over rough and uneven ground to efficiently clear the land of trees and other vegetation.

Another object of this invention is to provide a novel tree shaver implement wherein the cutting blades are secured to the motive equipment in a manner a maintain a constant slope for the blades regardless of the uneveness of the terrain over which the vehicle is moving.

And still another object of this invention is to provide a novel tree shaver having a canopy for deflecting the felled vegetation toward the sides of the cutting implement and thereby provide protection for the tractor and the operator thereof.

It is a further object of this invention to provide a novel land clearing implement which is economical and durable in construction and simple and efficient in operation.

Other objects and advantages of the invention will be evident from the following detailed description, read in conjunction with the accompanying drawings, which illustrate my invention.

Figure 1:
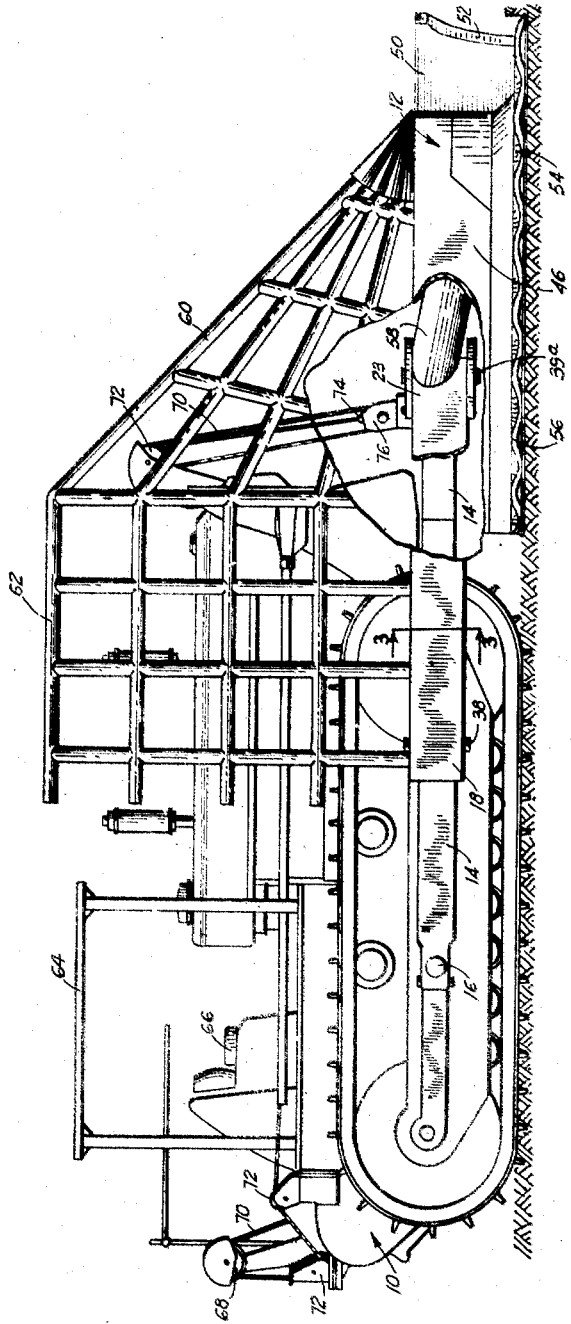
Figure 1 is a side elevational view of a land clearing implement embodying the invention.
Figure 2:
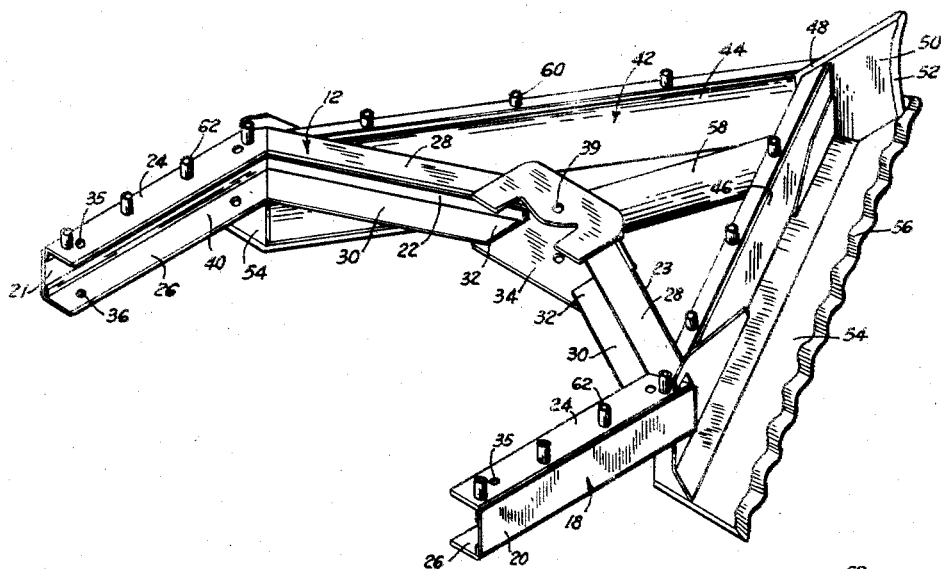
Figure 2 is a perspective view of the cutting elements of the invention.
Figure 3:
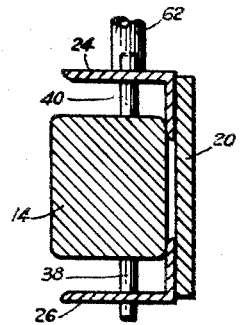
Figure 3 is a sectional view taken on line 3—3 of Fig. 1, and showing the cutting elements secured to the C-frame of the tractor.

Referring to the drawings in detail, reference character 10 refers in general to a suitable crawler or caterpillar type tractor having a land clearing or tree shaver implement 12 attached to the front end thereof. A C-frame member 14 is secured to the tractor 10 by oppositely disposed trunnion members 16 (only one of which is shown) in any well known manner. The C-frame member 14 extends along the sides of the tractor 10 and around the front thereof as is well known in the art. Forward motion of the tractor 10 is transmitted to the cutting implement 12 by the thrust of the C-frame 14 against the implement 12, as will be hereinafter set forth, thereby moving the cutting apparatus 12 ahead of the tractor 10 during the clearing operation.

The tree shaver implement 12 comprises a yoke-shaped member 18 of substantially the same configuration as the C-frame member 14. The member 18 is preferably constructed from a pair of oppositely disposed plate members 20 and 21 having inwardly diverging plate members 22 and 23 rigidly secured to the complementary ends thereof. Upper and lower inwardly directed flange members 24 and 26, respectively, are welded, or the like, to the plate members 20 and 21 to provide a substantially channel-shaped cross sectional configuration for the member 18. Similar upper and lower arms 28 and 30 are secured to the angularly disposed plate members 22 and 23. It will be apparent that the abutting ends of the upper arm members 28 and 24, and the abutting ends of the lower arm members 30 and 26 are suitably rigidly secured together by welding, or the like, to provide rigidity for the member 18. The inwardly directed end portions 32 of the angularly disposed portions of the member 18 are rigidly secured to a substantially channel-shaped bracket member or open bearing member 34 for a purpose as will be hereinafter set forth.

A plurality of spaced apertures 35 are provided on the upper flange members 24 in alignment with similar apertures 36 provided on the lower flange members 26. The aligned apertures 35 and 36 receive suitable pin members 38 (one of which is shown in Fig. 1) which extend transversely through the C-frame 14 for securing the member 18 thereto. Similar aligned apertures 39 are provided in the bearing member 34 for receiving a suitable pin member 39a for assisting in securing the C-frame to the member 18. The pin members 38 and 39a cooperate with the aligned apertures 35, 36 and 39 for slidably securing the member 18 to the C-frame 14 as will be hereinafter set forth, in a manner to preclude horizontal movement therebetween, yet permit relative vertical motion therebetween.

The upper and lower flange members 24 and 26, and the flange members 28 and 30 are spaced apart in order to provide a recess 40 for receiving the C-frame 14 therein. The width of the recess 40 is preferably five inches greater than the depth of the C-frame 14, but not limited thereto, thereby providing a lost motion area between the C-frame 14 and the member 18. This lost motion area provides for considerable vertical play between the yoke member 18 and the C-frame 14 whereby changes in the slope of the horizontal plane of the C-frame will not necessarily vary the constant horizontal position or movement of the yoke member 18.

Figure 4:
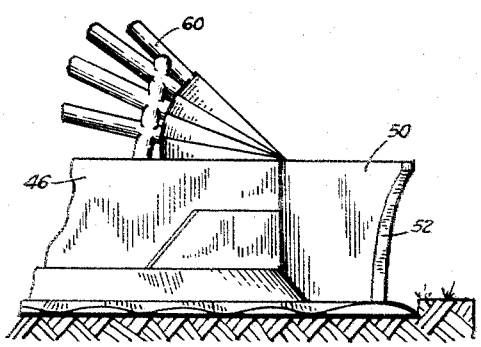
Figure 4 is an enlarged detail view of the cutter blades depicting the rotation thereof with the contour of the ground.

A substantially V-shaped cutter blade member 42 is suitably rigidly secured to the forward portion of the yoke member 18. The cutter blade member preferably comprises diverging side leg members 44 and 46 which are suitably secured such as by welding, or the like, to the forward end of the member 18 as clearly shown in the drawings. The front end portions of the leg members 44 and 46 converge at 48, and are provided with a vertical cutter member or plow portion 50 therebetween. The cutter member 50 is provided with a substantially vertical cutting edge 52 which functions as a plow member and leading edge for the cutting implement 12. An outwardly extending flange member 54 is rigidly secured to the lower portion of each of the leg members 44 and 46. The flange members 54 are preferably provided with an undulated cutting edge 56, although it will be apparent that the cutting edge may be straight if preferred. The flange portion 54 is substantially flat and is adapted to move along substantially with the contour of the ground, but it is preferably adjusted to move along approximately two inches below the top of the soil, as particularly shown in Fig. 4. Trees exposed above the ground are much more difficult to cut down than those underneath the ground. Consequently, the travel of the converging cutters 54 underneath the ground facilitates the cutting of the unexposed tree portions. A stabilizer brace member 58 is secured between the bearing member 34 and the converging ends of the leg members 44 and 46 to provide adequate bracing for the cutter member 42.

A plurality of welded tubular members 60 surround the upper portion of the cutter 42 in a manner to form a protective canopy or cage for deflecting the felled timber and vegetation outwardly away from the cutting member 42. Similar welded tubular members 62 extend upwardly from the yoke member 18 and span across the yoke in a manner to encircle the front portion of the tractor 10. The tubular members 62 thus provide a cage or canopy portion for the protection of the tractor. A suitable frame member or structure 64 is provided on the tractor 10 in the proximity of the seat portion 66 for the protection of the driver or operator of the tractor.

A suitable winch member 68 is provided on the tractor 10 for cooperating with suitable cables 70 and pulleys 72 in any well known manner for raising and lowering the cutter implement 12. The cable 70 preferably has one end anchored at 74 to a block member 76 which in turn is suitably secured to the cutting implement 12. The operator may thus vertically position the cutting elements 56 with respect to the ground level as desired. As hereinbefore set forth, it is preferable to position the cutter blades 56 in such a manner that they will cut about two inches below the surface of the ground.

*Operation*

The cutting implement 12 is positioned to the desired vertical disposition with respect to the ground level by means of the cooperating winch and cable apparatus. The tractor 10 is then driven forward in the usual manner to move the C-frame member 14 forward. The forward movement causes the C-frame 14 to thrust against the forward plate members 22 and 23 of the yoke member 18, thereby driving the entire cutting implement 12 forward. The leading edge 52 of the plow member 50 breaks the ground and vegetation in the usual manner to facilitate the clearing of the timberland. If the contour of the ground steepens causing the tractor 10 to move in a downward direction at a slight angle, the cutter implement 12 will not necessarily dig further into the ground, or change in horizontal disposition. The play provided between the C-frame 14 and the yoke member 18 by the recess 40 permits the cutters 54 to maintain their constant horizontal depth and angle of disposition regardless of any substantial variance in angular movement of the tractor 10. On the converse, if the tractor 10 moves in a slightly vertical upward angle, the play between the yoke member 18 and the C-frame 14 permits the cutters 54 to maintain their constant horizontal depth and slope beneath the ground regardless of the vertical angular upward movement of the tractor 10. It will be apparent that the five inch difference between the width of the recess 40 and the depth of the C-frame 14 is not a limitation, but may be varied within any practical limitations.

As the tractor 10 and tree shaver implement 12 move along the ground, the felled timber and vegetation are deflected outwardly from the cutters and tractor by the tubular members 60 and 62, thereby protecting the apparatus from damage therefrom. Furthermore, the frame member 64 substantially precludes striking of the tractor operator by the vegetation being cut. Thus, the tractor 10 and tree shaver implement 12 carried thereby may move forward substantially continuously any desired distance, leaving a swath of felled and cut vegetation behind the apparatus. Furthermore, it is not necessary to stop the tractor and back away from engaged timber because of binding or wedging of the cutter blades 54.

From the foregoing, it will be apparent that the present invention provides a novel land clearing implement provided with a lost motion connection between the motive vehicle and the cutting implement which permits a variance in the pitch or slope of the vehicle without necessarily changing the horizontal pitch of the cutting blades. This provides for a substantially continuous forward movement of the apparatus over the rough and uneven ground being cleared of heavy timber and other vegetation. There is substantially no necessity of stopping the forward movement of the apparatus due to wedging of the cutting blades in the timber being cut. Thus, the land clearing operation may be performed in an expeditious and economical manner not heretofore possible.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. A cutter implement attachable to a tractor having a C-frame provided therewith and forwardly thereof, and comprising a yoke member substantially complementary to said C-frame, upper and lower inwardly directed flange members provided on the yoke member, said upper and lower flange members providing a recess therebetween for receiving the C-frame, said recess of a greater width than the depth of the C-frame to provide a lost motion slot between the C-frame and the yoke member, cutter blade members rigidly secured to the forward portion of the yoke member, a plow member provided for the cutter blade members, means for providing for vertical adjustment of the cutter implement with respect to the tractor, and protective canopy rack means of tubular material for the cutter implement and tractor, said canopy extending upwardly and rearwardly of the tractor at least through half of the length of the tractor and cutter implement.

2. In a ground clearing apparatus attachable to a tractor having a C-frame member provided therewith, and comprising a yoke member substantially complementary to the C-frame member, a recessed portion provided in the yoke member for receiving the C-frame member, guide means to provide a forward movement of the yoke member by the thrust of the C-frame member thereagainst upon forward movement of the tractor, said means preventing horizontal movement of the yoke member relative to the C-frame said recessed portion providing a lost motion area between the C-frame and yoke member to provide for vertical movement between the yoke and the C-frame whereby changes in the slope of the C-frame will not change the slope of the yoke member, a V-shaped cutting element rigidly secured to the forward portion of the yoke member for movement therewith, a plow member provided on the cutting element for facilitating the cutting operation thereof, a stabilizer brace member provided between the yoke member and the cutting element, means for vertical adjustment of the cutter implement with respect to the tractor, and protective cage means for the cutter implement and the tractor.

References Cited in the file of this patent

UNITED STATES PATENTS

| | | |
|---|---|---|
| 1,171,603 | Foutz | Feb. 15, 1916 |
| 2,336,124 | Phoenix | Dec. 7, 1943 |
| 2,404,518 | Moran | July 23, 1946 |
| 2,512,666 | Meske | June 27, 1950 |
| 2,650,628 | Long | Sept. 1, 1953 |